United States Patent [19]

Chen et al.

[11] Patent Number: 5,355,777
[45] Date of Patent: Oct. 18, 1994

[54] HIGH TEMPERATURE ADIABATIC COOKING DEVICE

[76] Inventors: Tsang-Hue Chen; Chao J. Chen; Chao C. Chen; Chao Y. Chen, all of 6Fl. No. 53, Alley 22, Lane 553, Chung Hsiao E. Road, Sec. 4, Taipei, Taiwan

[21] Appl. No.: 124,028

[22] Filed: Sep. 21, 1993

[51] Int. Cl.$^5$ .................. A47J 27/00; A47J 36/00; A45C 11/20; B65D 8/06
[52] U.S. Cl. ...................................... 99/340; 99/403; 99/410; 99/413; 206/545; 206/546; 220/412; 220/902; 220/912
[58] Field of Search ............... 99/337, 339, 340, 403, 99/410–418, 467; 126/369, 375–377, 390; 206/541, 544–546, 549; 220/400, 411–413, 408, 426, 428, 431, 902, 912, 23.83

[56] References Cited

U.S. PATENT DOCUMENTS

| | | | |
|---|---|---|---|
| 1,648,725 | 11/1927 | Endicott | 220/408 |
| 2,781,937 | 2/1957 | Piker | 220/412 |
| 3,135,565 | 6/1964 | Bingham | 220/428 |
| 5,031,519 | 7/1991 | Toida et al. | 99/410 X |
| 5,092,229 | 3/1992 | Chen | 99/403 X |
| 5,251,542 | 10/1993 | Itoh et al. | 99/340 X |

Primary Examiner—Timothy F. Simone
Attorney, Agent, or Firm—Bacon & Thomas

[57] ABSTRACT

A cooking device having an outer pot and an inner pot removally suspended in the outer pot is proposed for better and easier cooking of foodstuff. The inner pot is made of thermally conductive, metallic material and is adapted for initially cooking foodstuff with a separate heater for a short period of time. The outer pot is made into a thermally insulated construction and adapted to house the inner pot containing the semi-cooked foodstuff in the outer pot in a thermally insulated manner, so as to allow the semi-cooked foodstuff to complete the cooking by its own latent heat without a further heating by an external heat supply means.

9 Claims, 4 Drawing Sheets

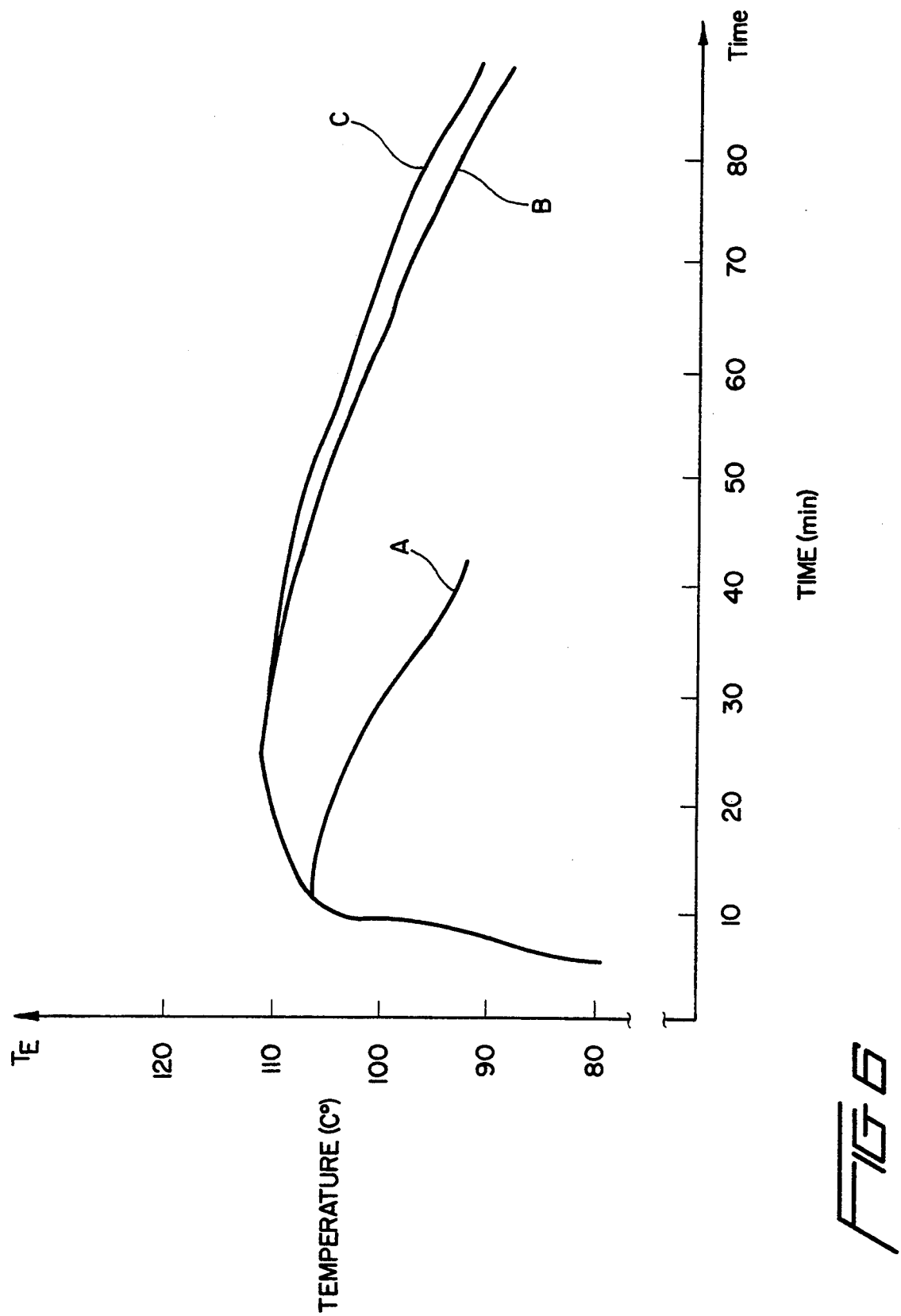

HIGH TEMPERATURE ADIABATIC COOKING DEVICE

FIELD OF THE INVENTION

The present invention relates to a high temperature adiabatic cooking device, particularly, to a high temperature adiabatic cooking device having an outer pot which is thermally insulated, and an inner pot removably placed in the outer pot, in which ingredients of foodstuff and water to be boiled are placed in the inner pot, heated there through until boiling and then maintained boiling for an appropriately short period of time depending upon the foodstuff to be cooked, the inner pot is thereafter placed in the outer pot followed with a lid having a high capacity of heat insulating covered thereon, the foodstuff is effectively cooked by the latent heat of the semi-cooked foodstuff in the inner pot adiabatically retained in the outer pot.

BACKGROUND OF THE INVENTION

Conventionally, a cooker, or a cooking device, generally has a pot member adapted to be placed on a furnace or a heater for transferring heat from the heat source to foodstuff contained in the pot member, until the foodstuff is cooked. A cooker provided with a built-in heater is convenient and has become very popular; such a cooker with a built-in heater generally has an inner pot made of thermally conductive material, and an outer pot having a thermally insulated casting, wherein the inner pot is removably placed in the outer pot which is provided with a built-in heater and a control device. In use, foodstuff is placed in the inner pot, which is then placed in the outer pot, and then the built-in heater of the outer pot is turned on to supply heat to the foodstuff in the inner pot. Some conventional electric cookers are provided with a timer or automatic temperature control device to enable users to set an appropriate cooking time. However, even with a sophisticated automatic control device, it is often difficult for an unskilled housewife to cook a foodstuff appropriately with a conventional electric cooker without consulting a cooking manual.

There is a special type of an electric cooker known as a "slow cooker" which is designed to cook foodstuff slowly with a minimum supply of heat (or energy) throughout the cooking process. However, it has been found out by the inventor of this invention that food can be better and easier cooked by initially supplying an ample amount of heat (or energy) for boiling for a short period of time, and then let the semi-cooked foodstuff cooked by its own latent heat thereafter without a continuous supply of heat energy.

SUMMARY OF THE INVENTION

The high temperature adiabatic cooking device of this invention has an inner pot made of thermally conductive material, an outer pot having a thermally insulated construction and being adapted to removably contain the inner pot, an inner lid for covering the inner pot, and an outer lid for covering the outer pot with the inner pot placed therein. The outer pot is particularly designed to exclude a heat supply means which could affect the thermal insulating capabilities of the outer pot. In use, the inner pot is first removed from the outer pot; the foodstuff to be cooked is placed in the inner pot which is then covered by the inner lid and heated with an appropriate heater for a short period until a sufficient amount of heat has been transferred to and absorbed by the foodstuff; then the inner pot with the foodstuff therein is placed in the outer pot. The outer pot with the inner pot placed therein is covered with the outer lid, so as to "seal in" the foodstuff containing a sufficient amount of heat to become cooked by its own latent heat, without receiving additional heat from or losing heat substantially to an external environment, or "adiabatically" in a more technical term.

According to a test, the cooker of this invention is capable of preserving heat of the foodstuff in the cooker, to such extent that the temperature of the foodstuff, one hour, one and a half hours, and two hours after the foodstuff in the inner is heated up to 100° C. and the inner pot with the foodstuff therein is placed in the outer pot and sealed, is maintained at above 93° C., about 90° C., and about 88° C., respectively.

The inner pot has an upper flange and the outer pot has shoulder for receiving the upper flange of the inner pot, such that when the inner pot is placed in the outer pot, the inner pot is "suspended" within the outer pot to maintain a space between the entire outer surface of the inner pot and the entire inner surface of the outer pot.

BRIEF DESCRIPTION OF THE DRAWINGS

FIG. 6 is the composite graph of temperature of variation foodstuff in the covered cooking device versus time showing the temperature change of the foodstuff in the covered cooking device with time.

DETAILED DESCRIPTION OF THE INVENTION

Figure 1:
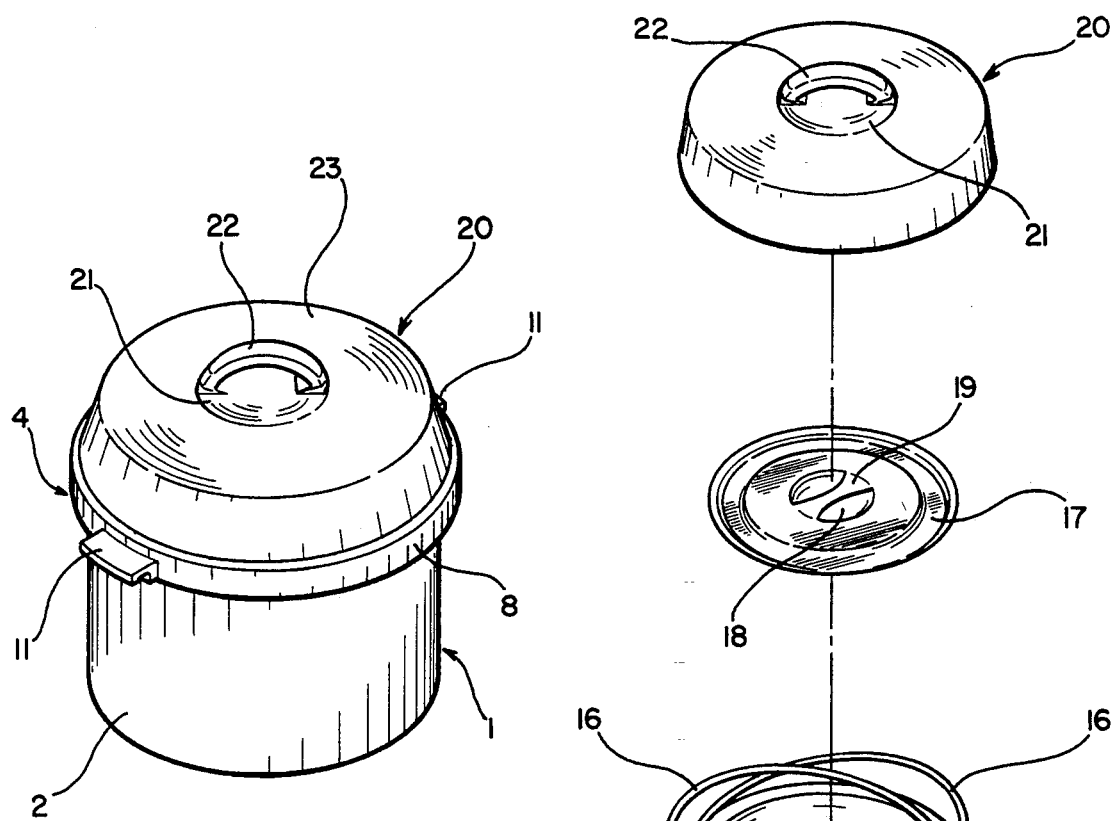
FIG. 1 is a front elevational view of a high temperature adiabatic cooking device according to the present invention.
Figure 2:
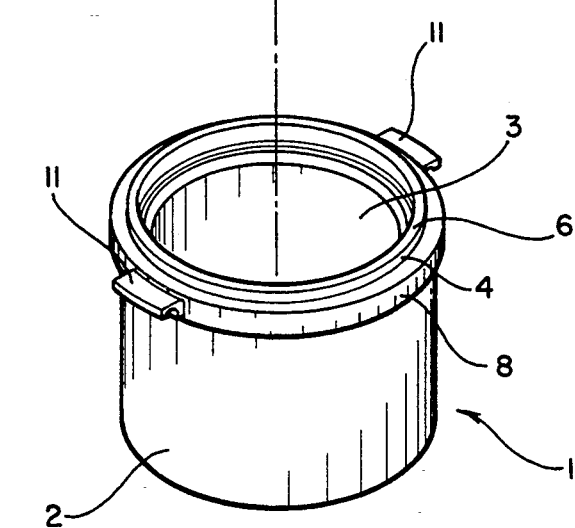
FIG. 2 is an exploded view of FIG. 1.
Figure 3:
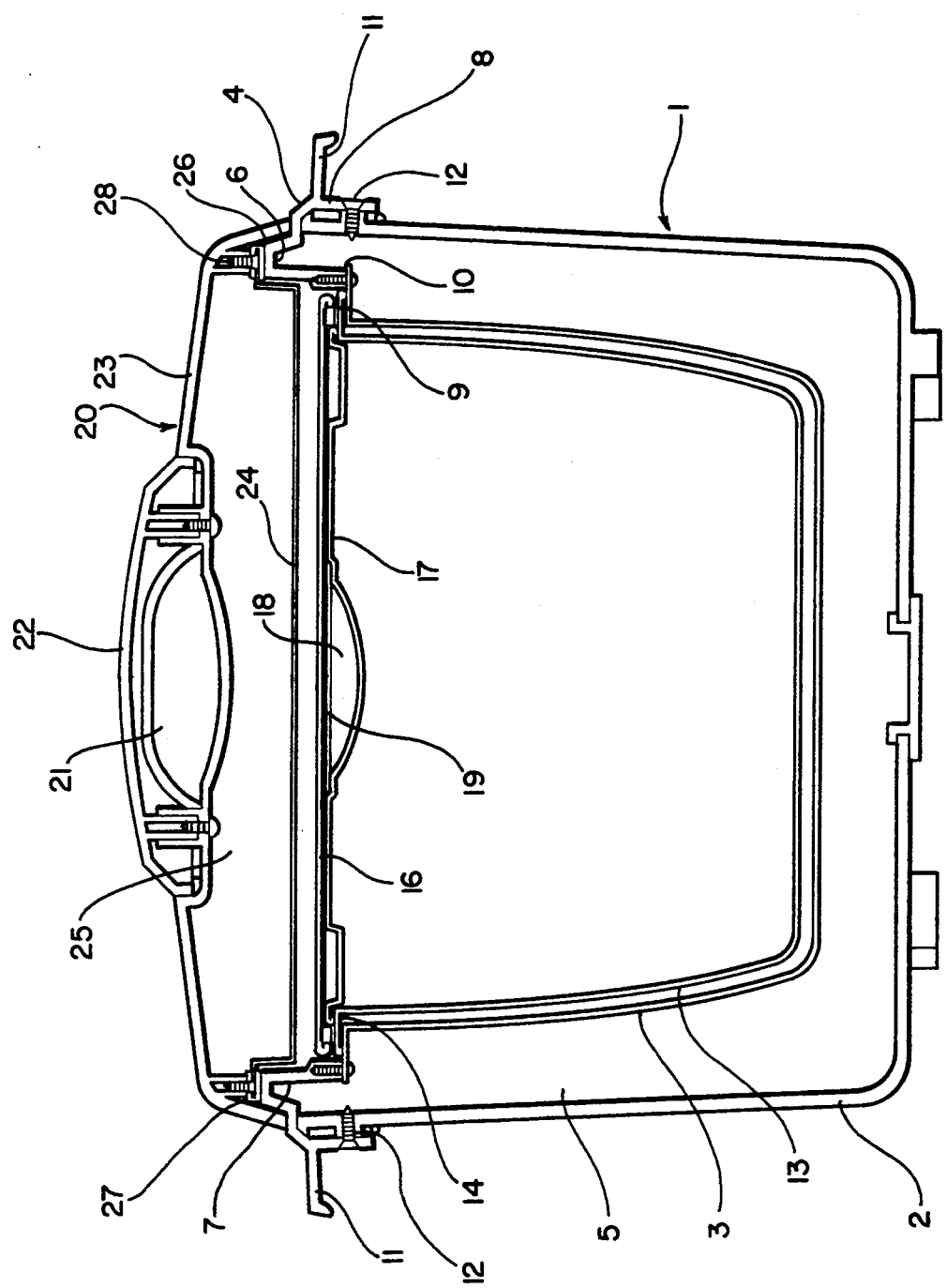
FIG. 3 is a longitudinal sectional view of FIG. 1.
Figure 4:
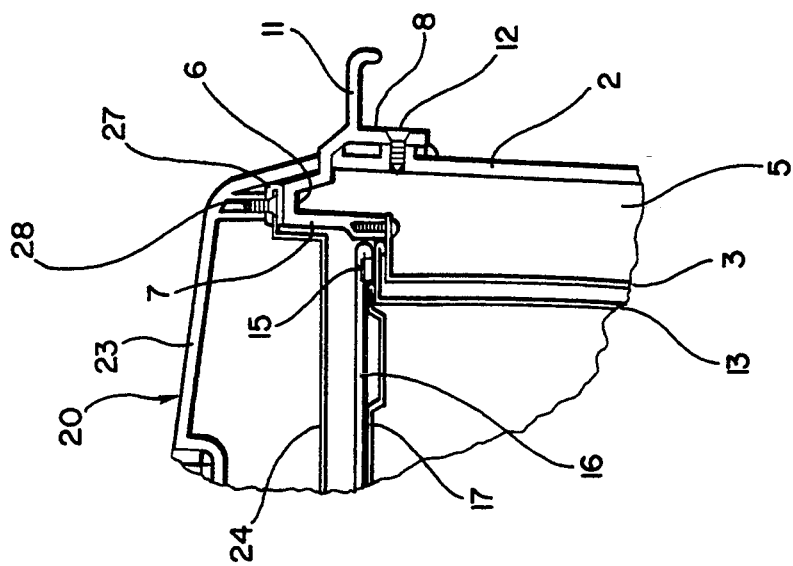
FIG. 4 is an enlarged fragmentary sectional view of FIG. 3.

Referring to the drawings which illustrate an embodiment of the high temperature adiabatic cooking device of the present invention, the cooking device includes an outer pot 1 having a thermally insulated construction, an inner pot 13 removably disposed in the outer pot 1, an outer lid 20 for covering outer pot 1, and an inner lid for covering inner pot 13.

The outer pot 1 is comprised of an outer shell 2, an inner shell 3, a heat insulating material 5 filled in between the outer shell 2 and the inner shell 3, and a ring frame 4 affixed onto upper edges of outer shell 2 and inner shell 3.

The outer shell 2 is made of a rigid resin material such as acrylonitrile-butadiene-styrene, polypropylene or equivalent, and is formed into a container shape with a bottom. The inner shell 3 is made of metallic material such as stainless steel or a rigid resin material as above mentioned and has a similar shape to that of the outer shell 2. Inner shell 3 has an upper flange to form a shoulder 9 at an upper, inner part of the outer pot 1. Between inner shell 3 and outer shell 2 a spacing of 10-40 mm preferably of 15-35 mm, more preferably of 20-30 mm is maintained to accommodate the heat insulating material 5 having a thermal conductivity (K) less than 0.15 w/m° C., preferably less than 0.10 w/m° C. more preferably less than 0.05 w/m° C., which may be polyurethane foam or glass fiber.

The outer lid 20 has heat insulating capacity and is used to cover the opening of the outer pot 1 in an air tight manner; the inner pot 13 is removably housed in the outer pot 1 and used for containing foodstuff such as grains and water to be cooked; an inner lid 17 is used for covering the opening of the inner pot 13. The outer lid 20 comprises upper lid body 23 made of rigid resin, lower lid panel 24 mounted on the bottom part of the upper lid body 23 and maintained a distance at least between 20 mm and 35 mm from the upper lid body 23; a heat insulating polyurethane foam 25 which fills the space between the upper lid body 23 and the lower lid panel 24; the inner pot 13 is housed and suspended in the outer pot 1 by a flange 14 which is outwardly extended from the top part of the wall of the inner pot 13 resting on a shoulder 9 which is formed on the inner, upper part of the outer pot 1, and thus the outer wall of the inner pot 13 and the inner wall of the inner shell 3 of the outer pot 1, as well as the lower lid panel 24 of the outer lid 20 and the inner lid 17 are maintained in a separate state.

Moreover, the lower lid panel 24 of the outer lid 20 can be further circumferentially mounted with a flexible heat insulating mat 27, which is made of the heat-resistant material such as silicone rubber, having a low thermal conductivity. With the mat 27, the possibility of heat transfer from the lower lid panel 24 to the upper lid body 23 will be reduced to minimum and the air tight sealing between the lower lid panel 24 and the insulating container 1 is enhanced.

Due to the extremely low heat loss of the inner pot to the insulating container and the excellent insulating capacity of the insulating container itself, the cooking device can be utilized for cooking steamed rice, gruel, meats, beans, a variety of vegetables and the like for saving the energy consumed in the process of cooking. Such cooking is easily done (completed) by boiling the food in the inner pot 13 for a short period of time, then placing the inner pot 13 in the outer pot and with the outer lid covered thereupon to convert the food into a sufficiently cooked state.

The present invention will be further described hereinunder in more detail with reference to the accompanying drawings.

The inner shell 3 has an opening with a diameter smaller than that of outer shell 2 so as to maintain a distance between the walls of inner shell 2 and outer shell 3 at least between 20 mm and 30 mm while the inner shell 3 is placed in the outer shell 2. Ring frame 4, which comprises bracket 6, inner flange 7 and outer flange 8, is made of synthetic resin and connects the top parts of the inner shell 3 and the outer shell 2; the inner flange 7 is secured to the shoulder 9, which is outwardly extended from the top of the wall of the inner shell 3, by means of a screw 10, and is used for suspending the inner pot 13. The top part of the outer flange 8 is outwardly extended to form a handle 11 and the lower part of the outer flange 8 is secured to the outer shell 2 by means of a screw 12, the heat insulating polyurethane foam 5 of a thermal conductivity of about 0.05 w/m° C. is made by injecting into the space between the outer shell 2 and the inner shell 3, fully filling the space after solidification into a foam; the foam is preferably at least of 10 mm in thickness in order to ensure sufficient thermal insulation. The thicker the foam, the better the heat insulation, but the accompanying disadvantages such as increased cost should be as well taken into account, and a large cooking body needed to house the foam, therefore, the thickness is preferably below 35 mm, a compromised thickness of the foam for all costs, volume of cooking body and heat insulating capacity is found to be a thickness between 20 mm and 30 mm in accordance with the results of extensive experiments.

The inner pot 13, which is in a cylinderial shape with a bottom, is suspended in the outer pot 1 by means of resting the flange 14, which is outwardly extended from the top part of the wall of inner pot 13, on the shoulder 9 of the inner shell 3 of the outer pot 1, the outer wall of the inner pot 13 and inner shell 3 are therefore maintained in a separate state. A lift-out stem 16 is pivotally attached to a supporting part 15 on the flange 14 and the lift-out stem 16 can be rested on the flange 14 while not in use.

The substantial center of the inner lid 17, which is made of transparent, high temperature resistant glass or metallic material such as stainless steel, is located with a concave part 18 and a knob 19 on the inner lid 17 is fixed across the concave part 18.

The outer lid 20 is comprised of a covered-plate-shape upper lid body 23 made of synthetic resin, a plate-shaped lower lid panel 24 mounted on the bottom part of upper lid body 23 and a heat insulating polyurethane foam 25 which fills the space between the upper lid body 23 and the lower lid panel 24. A concave part 21 and the knob 22 are located on the upper lid body 23 and the space in the concave part is big enough for hand or fingers to handle the outer lid 20 by grasping the knob 22. A concave part 26 in the inner side of the lower part wall of the outer lid 20 is formed between the lower inner wall of upper lid body 23 and the top flat part of lower lid panel 24, therefore, the concave part 26 and the bracket 6 of the flange 4 are packed by the concave-convex mechanism to provide an excellent air tight sealing between the outer lid 20 and the outer pot 1.

Moreover, the heat insulating mat 27, which is made of high temperature resistant, flexible material such as silicone rubber, is circumferentially mounted on the concave part 26 of the outer lid 20 and tightly contacts with the top flat part of the bracket 6 to prevent the heat dissipating from inside of the cooking device. The top flat part of the lower lid panel 24 is clamped with the "U" shaped heat insulating ring 27 and the lower lid panel 24 is fixed on the upper lid body 23 by means of screwing screw 28 through the top flat part of lower lid panel 24 and the heat insulating ring 27, therefore, the heat of the lower lid panel 24 is not transferred onto the upper lid body 23.

Figure 5:
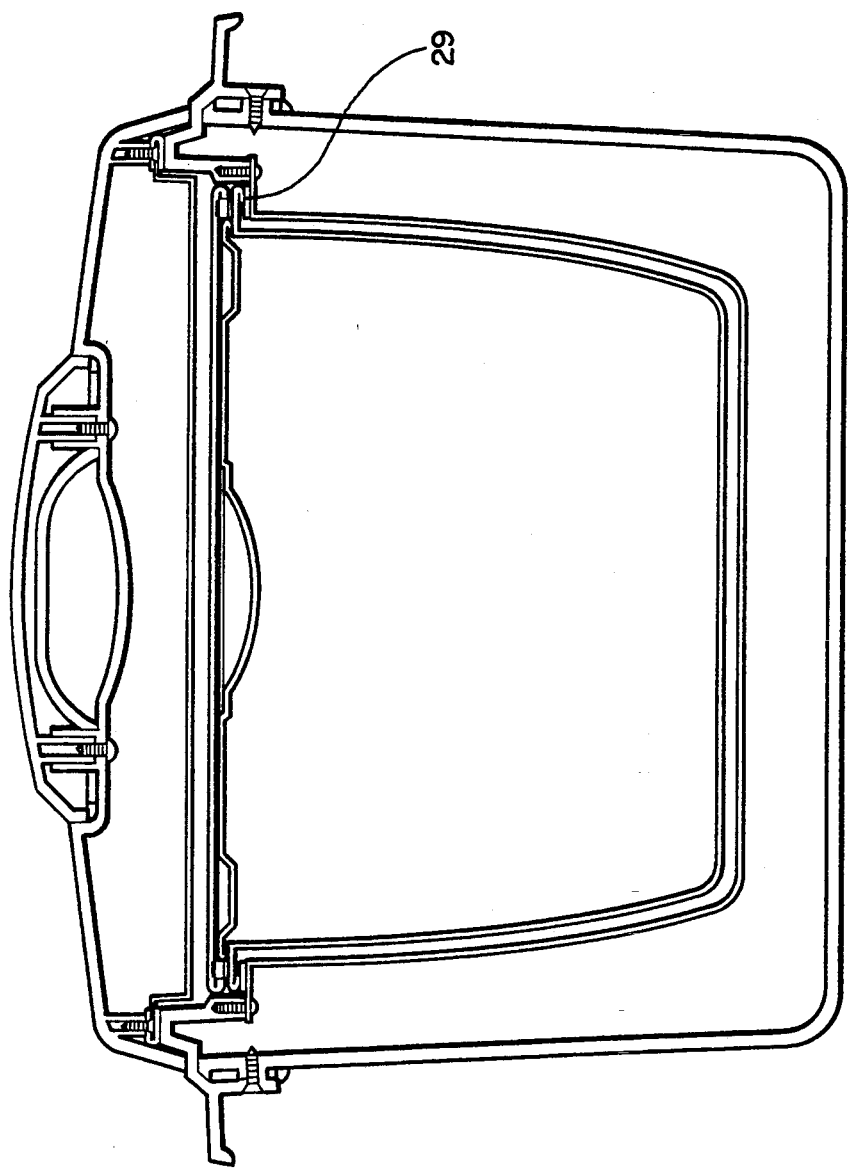
FIG. 5 is a vertical sectional view of another embodiment of the high temperature adiabatic cooking device according to the present invention.

In order to avoid the heat of the inner pot 13 being transferred to the inner shell 3 through flange 14, a rigid heat insulating ring 29 (see FIG. 5) is mounted on the shoulder 9 of the inner shell 3; the heat insulating ring 29 is made of a material with a high temperature resistant and high heat insulating capacity such as chloroprene rubber, Bakelite, and phenol rubber. The use of the heat insulating ring 29 therefore further improves the efficiency of heat insulating between the inner pot 13 or the inner lid 17 and outer pot 1.

The following are examples of the cooking procedures and results for preparing variation of foods using the cooking device illustrated in FIG. 1 through FIG. 4:

(I) Gruel 200 g of rice and 1500 cc. of water were placed in the inner pot, rapidly heated to reach boiling within about 9 minutes (23° C. of room temperature), kept boiling for further about 20–30 seconds, covered immediately with inner lid and transferred into the outer pot as well as covered with the outer lid. the rice turned into a swollen state which is ready for eating (the amount of the resulting gruel is enough for a meal of 4–6 people) after 30 minutes. Referring to the curve A of FIG. 6, the temperature of the gruel at the end of cooking is about 96° C. A sticky paste gruel will be formed if the gruel further stands for a longer time.

(II) Cooked Rice

The procedure used and results were similar to that described in (I) except that the amounts of rice and water used were 200 g and 350 cc., respectively, as well as the resulting rice was in a slightly swollen, semi-dry state and suitable for eating.

(III) Beef and Vegetable Soup

Conventionally, the soup is cooked by simmering for a period of time between 90 and 120 minutes. When using present cooking device, beef 3 cm beef dice, vegetables of carrot, cabbage, radish, onion, tomato and potato being in the appropriate size and water were placed in the inner pot, rapidly heated to reach boiling within 10 minutes, kept boiling for further 15 minutes, covered immediately with inner lid and transferred into the outer pot as well as covered with outer lid. The beef and vegetables were well done and suitable for eating after 60 minutes. Referring to the curve B of FIG. 6, the temperature of the soup is dropped to 94° C. at the end of cooking.

(IV) Red Beans Soup 300 g of red beans and 1500 cc. of water were placed in the inner pot, rapidly heated to reach boiling within 9 minutes and kept boiling for further 15 minutes, and immediately housed in the outer pot. The red beans were turned moistened and swollen, suitable for eating after 60 minutes of standing in the outer pot. Referring to curve °C. of FIG. 6, the temperature of the red beans soup is 90° C. at the end of cooking. It should be noted that the red beans can be, of course, presoaked in water at room temperature before heating to shorten the cooking time.

Furthermore, when the present invention is used to prepare steamed rice, rice and water with a ratio as described above can be boiled in the inner pot and then placed in the outer pot covered with the outer lid in the night, the rice will become cooked in the next morning and will has a temperature of 45°–65° C. It should be noted that the cooked rice prepared by using the cooking device of the present invention can be maintained at an elevated temperature for a long period of time without being additionally heated. Meanwhile, the disadvantage that the upper portion of cooked rice prepared by the conventional electric cooker will be yellowed as well as stiffened after a certain period of time will be effectively eliminated.

In conclusion from the above, the inner pot with the inner lid is suspended on the outer pot, and the heat insulating polyurethane foam with thickness ranging from about 15 mm to 35 mm (preferably 20–30 mm) are filled in the space both between the inner shell and the outer shell of the outer pot as well as between the upper lid body of the outer lid and the lower lid panel of the outer lid, therefore, the temperature of food kept in the inner pot of the cooking device can be maintained at a relatively high level such that cooking can be effectively completed without a further supply of heat after the initial cooking, the conservation of energy, the maintaining of the original flavors of the foodstuff after being cooked and the efficiency of cooking can be greatly improved. In the mean time, it can be understood from the above that the present cooking device has advantages of easy operation and greatly reduced operation time.

What is claimed is:

1. A high temperature unheated adiabatic cooking device comprising:
    an inner pot made of a thermally conductive material and having an outer surface and an upper flange extending laterally outwardly from the outer surface;
    an inner lid for covering said inner pot, said inner lid having an outer surface;
    a thermally insulating ring interposed between the flange and the inner lid so as to minimize heat transfer between the inner pot and inner lid;
    an outer pot having a thermally insulated construction, said outer pot having an inner surface and a shoulder provided at an inner upper part of said outer pot to receive said upper flange of said inner pot such that said inner pot is removably supported in said outer pot by the upper flange on the shoulder so as to maintain a space between the entire outer surface of said inner pot and the entire inner surface of said outer pot;
    an outer lid having a thermally insulated construction for covering said outer pot, thereby completely enclosing said inner pot covered with said inner lid and said upper flange, in an air tight manner, said outer lid having an inner surface spaced from the entire outer surface of said inner lid; and,
    a thermally insulating layer interposed between the outer lid and the outer pot;
    wherein said outer pot is comprised of an inner shell made of a rigid material, an outer shell and a heat insulating material disposed between the inner and outer shells having a thickness of from 10 to 40 mm to achieve a heat preservation capability of maintaining the temperature of the material within the inner pot above 93° C. for one hour after said material in said inner pot is heated to 100° C. and placed in said outer pot.

2. The cooking device according to claim 1, wherein said heat insulating material between inner and outer shells of the outer pot has a thickness of from 10 to 40 mm and a thermal conductivity (K) of less than 0.15 w/m° C.

3. The cooking device according to claim 1, wherein said heat insulating material between the inner and outer shells of the outer pot has a thickness of from 15 to 35 mm.

4. The cooking device according to claim 1, wherein said heat insulating material between the inner and outer shells of the outer pot has a thickness of from 20 to 30 mm.

5. The cooking device according to claim 2, wherein said heat insulating material between the inner and outer shells of the outer pot has a thermal conductivity (K) of less than 0.10 w/m° C.

6. The cooking device according to claim 6, wherein said heat insulating material between the inner and outer shells of the outer pot has a thermal conductivity (K) of less than 0.05 w/m° C.

7. A high temperature unheated adiabatic cooking device comprising:

an inner pot made of a thermally conductive material and having an outer surface and an upper flange extending laterally outwardly from the outer surface;

an inner lid for covering said inner pot, said inner lid having an outer surface;

a thermally insulating ring interposed between the flange and the inner lid so as to minimize heat transfer between the inner pot and inner lid;

an outer pot having a thermally insulated construction, said outer pot having an inner surface and a shoulder provided at an inner upper part of said outer pot to receive said upper flange of said inner pot such that said inner pot is removably supported in said outer pot by the upper flange on the shoulder so as to maintain a space between the entire outer surface of said inner pot and the entire inner surface of sad outer pot;

an outer lid having a thermally insulated construction for covering said outer pot, thereby completely enclosing said inner pot covered with said inner lid and said upper flange, in an air tight manner, said outer lid having an inner surface spaced from the entire outer surface of said inner lid;

a thermally insulating layer interposed between the outer lid and the outer pot;

wherein said outer pot is comprised of an inner shell made of a rigid material, an outer shell and a heat insulating material disposed between the inner and outer shells having a thermal conductivity (K) of less than 0.15 w/m° C. to achieve a heat preservation capability of maintaining the temperature of the material within the inner pot above 93° C. for one hour after said material in said inner pot is heated to 100° C. and placed in said outer pot.

8. The cooking device according to claim 7, wherein said heat insulating material between the inner and outer shells of the outer pot has a thermal conductivity (K) of less than 0.10 w/m° C.

9. The cooking device according to claim 8, wherein said heat insulating material between the inner and outer shells of the outer pot has a thermal conductivity (K) of less than 0.05 w/m° C.

* * * * *